United States Patent [19]

Lindvall

[11] Patent Number: 5,014,726
[45] Date of Patent: May 14, 1991

[54] APPARATUS FOR CONVEYING ARTICLE CARRIERS ALONG A SUCCESSION OF PROCESSING STATIONS

[76] Inventor: Sture S. Lindvall, Henrik Palmes Allé 18, S-182 62 Djursholm, Sweden

[21] Appl. No.: 469,421
[22] PCT Filed: Oct. 6, 1988
[86] PCT No.: PCT/SE88/00513
§ 371 Date: Mar. 30, 1989
§ 102(e) Date: Mar. 30, 1989
[87] PCT Pub. No.: WO89/03355
PCT Pub. Date: Apr. 20, 1989

[30] Foreign Application Priority Data

Oct. 7, 1987 [SE] Sweden .................. 8703860

[51] Int. Cl.⁵ .............................. B05C 3/02
[52] U.S. Cl. ......................... 134/76; 134/82; 118/423; 118/428; 414/222
[58] Field of Search ............ 134/76, 82, 83; 118/423, 426, 427, 428; 414/222

[56] References Cited

U.S. PATENT DOCUMENTS

| | | | |
|---|---|---|---|
| 2,965,110 | 12/1960 | Borodin | 134/76 |
| 3,078,859 | 2/1963 | Davis et al. | 134/83 |
| 3,888,270 | 6/1975 | Crapet | 118/427 |
| 4,208,119 | 6/1980 | Spence-Bate et al. | 134/76 |
| 4,331,230 | 5/1982 | Buckley | 134/83 |
| 4,351,266 | 9/1982 | Ando et al. | 134/82 |
| 4,370,991 | 2/1983 | Lindvall | 134/76 |
| 4,431,293 | 2/1984 | Riekkinen | 134/76 |
| 4,607,930 | 8/1986 | Castellarin | 134/76 |
| 4,932,427 | 6/1990 | Yamada et al. | 134/76 |
| 4,936,328 | 6/1990 | Yatable | 134/76 |

FOREIGN PATENT DOCUMENTS 968764 3/1958 Fed. Rep. of Germany.
1531840 1/1970 Fed. Rep. of Germany.
2518790 4/1980 Fed. Rep. of Germany.

Primary Examiner—William A. Cuchlinski, Jr.
Assistant Examiner—William C. Dowling
Attorney, Agent, or Firm—Ware, Fressola, Van Der Sluys & Adolphson

[57] ABSTRACT

Apparatus for conveying article carriers (11) through a series of processing stations (T) in the form of tanks into which articles supported by the carriers are to be dipped has a row of lifting devices (13A–13H), each including an article carrier support (17) which defines a section of a horizontal processing track along which the article carriers (11) are movable in succession. The article carrier supports (17) are individually displaceable vertically between an upper position and a lower position (dipping position). When adjacent article carrier supports (17) are simultaneously in the upper position, an article carrier on one of the article carrier supports can be fed over to the other. A sensor (K) triggers lowering of said other article carrier support to the lower position in response to the reception of the article carrier by that article carrier support. When supported by the article carrier support provided at the downstream end of the processing track, the article carrier is displaced, together with the article carrier support generally horizontally transversly of the processing track to a return track on which the article carrier is returned to a position opposite the processing track.

13 Claims, 3 Drawing Sheets

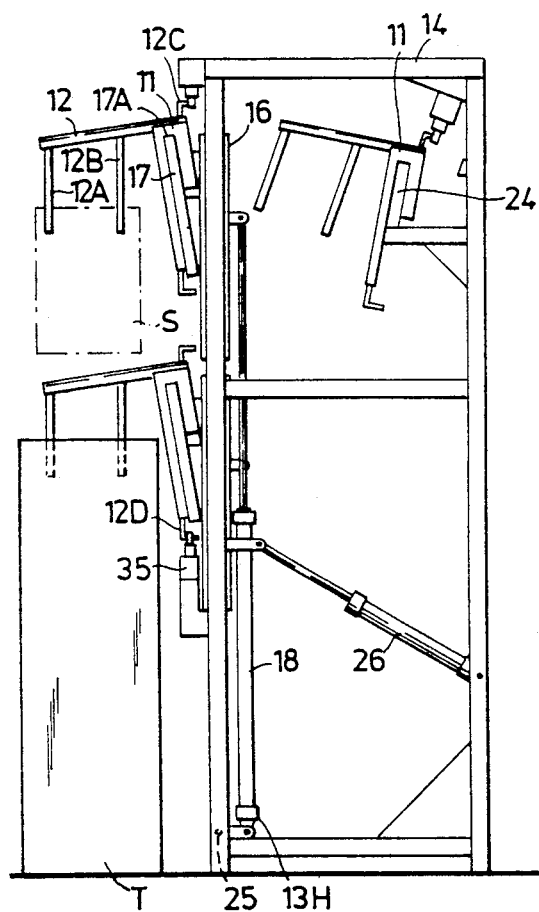
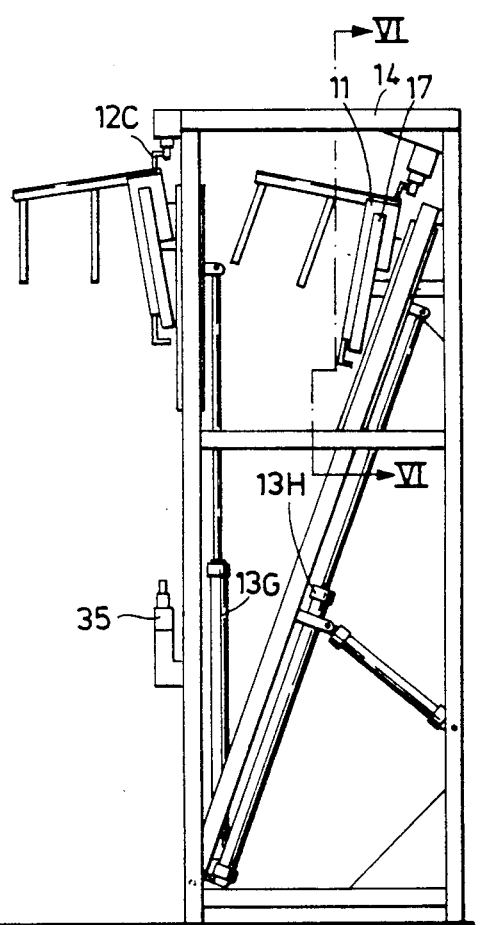

APPARATUS FOR CONVEYING ARTICLE CARRIERS ALONG A SUCCESSION OF PROCESSING STATIONS

BACKGROUND OF THE INVENTION

This invention relates to an apparatus for conveying article carriers along a succession of processing stations. More particularly, the invention relates to an apparatus for conveying articles in an installation for dip treatment.

Although it is not so limited, the apparatus according to the invention is applicable with particular advantage in cases where individual articles, or groups of articles handled as a unit, are to undergo a multi-step treatment involving dipping of the articles or article units in a succession of processing baths in accordance with a predetermined program.

Installations for that kind of treatment have to be readily adaptable, without having to be complicated, to the particular treatment to be carried out. Such adaptation may involve, for example, changing the number or type of baths, changing, in respect of one or more baths, the time that the articles are immersed in the baths, changing the time elapsing between the raising of an article from one bath and the immersion of the article in the next bath, and including or omitting agitation of the articles immersed in the baths.

An object of the invention is to provide an apparatus that meets this requirement in an advantageous way.

SUMMARY OF THE INVENTION

To this end, in an apparatus for conveying article carriers along a succession of processing stations, particularly an apparatus forming part of an installation for dip treatment of articles supported by the article carriers, which apparatus comprises means for stepwise displacement of the article carriers in succession on a processing track which supports the article carriers and along which the processing stations are positioned, and means for vertically displacing the article carriers individually between an upper and a lower position, said means including for each processing station an article carrier support which defines a separate section of the track and is movable between the upper position and the lower position together with an article carrier, control devices are associated with respective ones of the article carrier supports and positioned along the processing track, the control devices being connected to said means for vertically displacing the article carriers and adapted to trigger the vertical displacement of the respective associated processing track section in response to an article carrier occupying a predetermined position on the processing track.

An embodiment of the invention is described in greater detail hereinafter, by way of example, with reference to the accompanying drawings.

BRIEF DESCRIPTION OF THE DRAWINGS

FIG. 3 is a view of the installation as viewed from the right in FIG. 1;

FIG. 4 is a view similar to FIG. 3 but showing certain parts in a different position;

DETAILED DESCRIPTION OF THE PREFERRED EMBODIMENT

Figure 1:
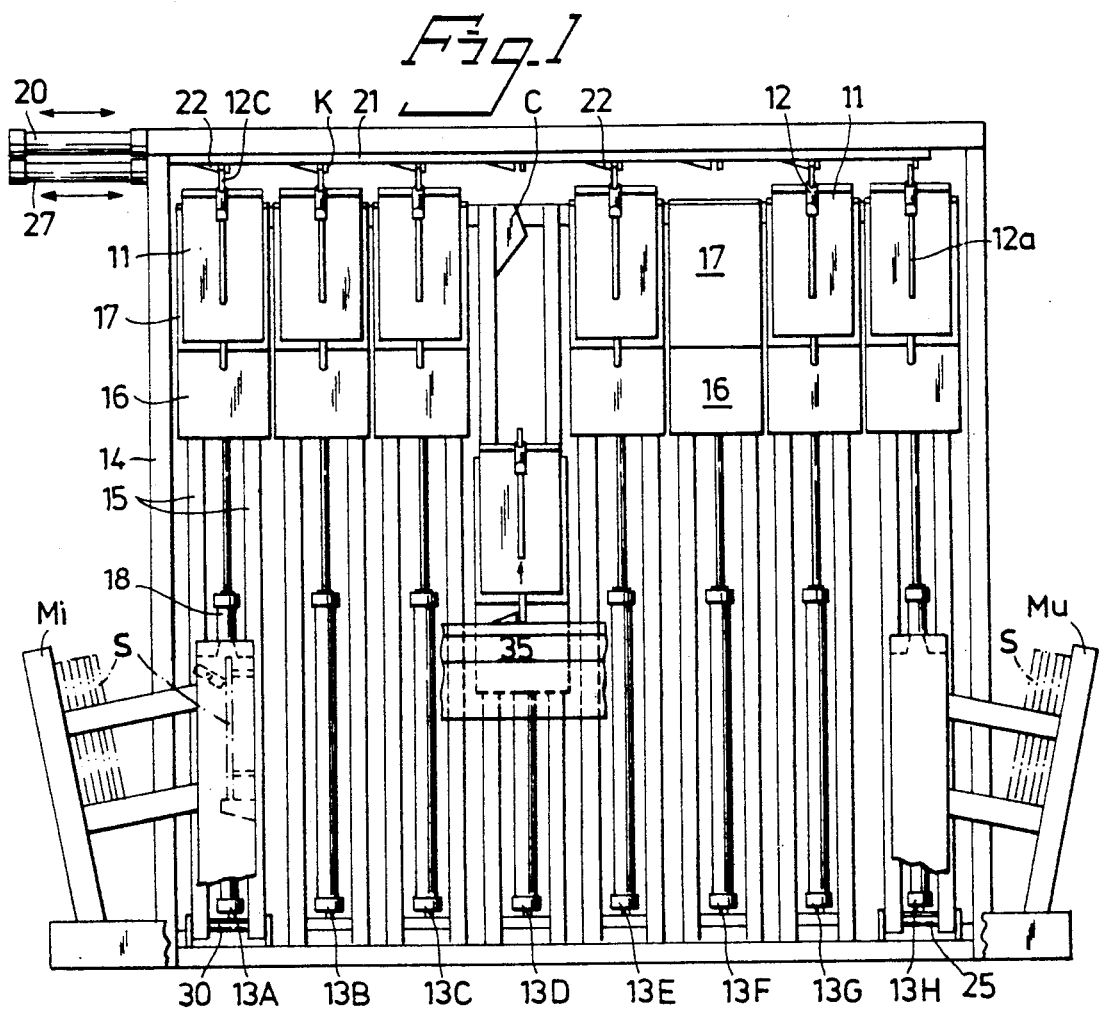
FIG. 1 is an elevational view of a dip treating installation incorporating a conveying apparatus according to the invention.

The conveying apparatus shown by way of example is intended for conveying articles in the shape of flat plates through a succession of processing stations comprising a row of six tanks which hold baths into which the plates are to be dipped. In FIGS. 1 and 3, such plates are indicated in phantom lines and designated by S. In the interest of simplicity of illustration, the row of tanks is shown only in FIGS. 2 and 3 where it is designated by T.

While it is being conveyed through the processing stations, that is, from one end of the row of tanks T to the other, each plate S is held by an article carrier in the shape of a slider 11 having a plate holder 12 provided with two clamps 12A, 12B. The sliders 11 are moved in a circulatory system in a manner described in greater detail below.

The conveying apparatus comprises eight lifting devices 13A-13H. Each lifting device operates to displace a slider 11 vertically between an upper position and a lower position; in FIG. 1 one slider 11, namely the slider shown together with the lifting device 13D, is in the lower position, while the other sliders are in the upper position, see also FIG. 3. The lifting devices are arranged in a row by the side of the row of tanks T along one of the long sides of a frame 14 which is rectangular in plan view and in elevation.

Associated with the first lifting device 13A is a feed storage rack Mi which is adapted to hold a stack, positioned edgeways, of plates S to be conveyed through the processing stations of the plate treating installation so as to be treated in them. From this storage rack the plates are picked one by one by the plate holders 12 with the aid of the lifting device 13A. A discharge storage rack Mu is associated with the last lifting device 13H and adapted to receive the treated plates.

Each lifting device comprises a vertical guideway formed of a pair of parallel guide bars 15 supporting a sliding head 16 to which a slider support 17 is attached. The sliding head 16 is movable along the vertical guideway by means of a fluid pressure cylinder 18 to displace a slider 11 positioned on the slider support 17 between the upper and lower positions.

As shown in the drawings, each slider support 17 comprises a slightly inclined plate having a horizontal upper edge 17A. A slider positioned on the slider support is horizontally movable along this upper edge which thus forms a section of a track for the slider. Moreover, the sliders and the slider supports are shaped and arranged such that a slider can at any time, in one single manipulation by an operator, be unhooked or removed in some other way from the slider support on which it is supported at that time. From FIG. 1, it is seen that the slider supports are very closely spaced in the longitudinal direction of the frame 14, so that the track sections of adjacent slider supports positioned at the same level follow one upon the other almost without any intervening gap or, in other words, so that a slider positioned on one slider support can be moved directly over to the adjacent slider support. This is true both when the adjacent slider supports are in the upper position and when they are in the lower position.

Sliders 11 positioned on the slider supports 17 which are in the upper position are displaced or advanced by means of a fluid pressure cylinder 20 and a horizontal driving bar 21 which is connected to the piston rod of the cylinder and extends along one of the upper lateral members of the frame 14. The driving bar 21 is provided with a number of pivotable driving lugs 22, one for each slider support 17 except the one belonging to the last lifting device 13A, and is reciprocable by means of the cylinder 20 over a distance slightly longer than the distance between the vertical center lines of adjacent slider supports.

The position of the zone in which the driving bar 21 is reciprocated and the arrangement of the driving lugs 22 on the driving bar are such that when the driving bar is moved forwardly, to the right in FIG. 1, the driving lugs engage a finger 12C on a slider 11 located on the respective associated slider support 17 and push the slider over to a predetermined position on the next slider support. Upon retraction of the driving bar the driving lugs are pivoted upwardly by the fingers of the respective next succeeding sliders and then return to the driving position in readiness for the next forward movement of the driving bar.

As a slider 11 is advanced from one slider support to the next slider and is received in the predetermined position on the latter, its finger 12C actuates a sensor K which is in the shape of an electric switch in the illustrated embodiment. As a consequence, a control system of the conveying apparatus—a portion of this control system is shown diagrammatically in FIG. 5—triggers a vertical displacement, downwardly in this case, of the receiving slider support. An upward vertical displacement is then triggered when a set time has elapsed after the triggering of the downward movement.

Figure 5:
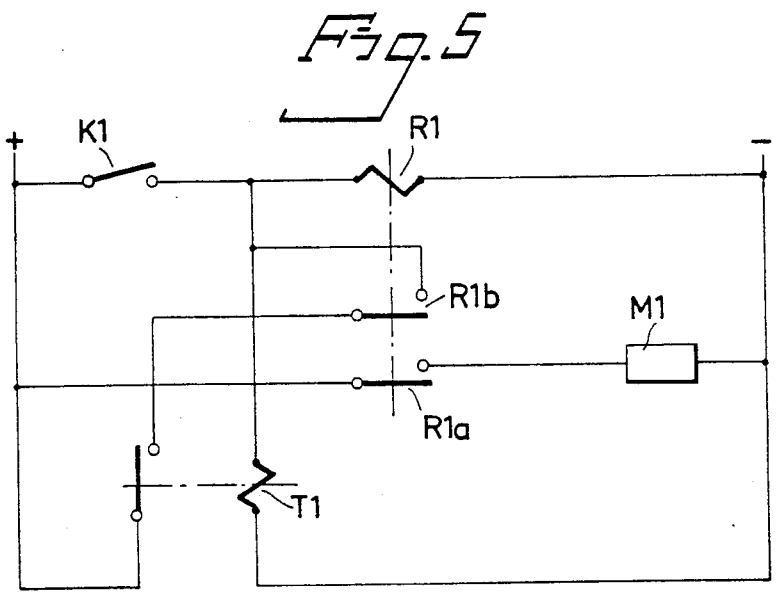
FIG. 5 is a circuit diagram of a portion of an electrical control system for the vertical movement of lifting devices.

FIG. 5 is a simplified illustration of a portion of the above-mentioned control system, namely a portion that is operative to control the vertical displacement of a single slider; all sliders are controlled in substantially the same manner.

In FIG. 5, the just-mentioned sensor is represented by a normally open switch (microswitch) K1. When this switch is closed as a result of the actuation of the sensor by the slider finger 12C, current can pass both through a relay R1, which then closes a contact R1a and thereby completes a circuit through a solenoid valve M1 and which simultaneously closes a holding contact R1b, and through a timing relay T1, which completes a holding circuit of relay R1 through its holding contact R1b. The energization of the solenoid valve M1 causes this valve to pass fluid pressure to one side of the cylinder 18 so that the slider support 17 is moved downwardly.

When the time set for the timing relay T1 has elapsed, this relay opens the holding circuit of the relay R1 which in turn interrupts the energization of the solenoid valve M1 so that this valve causes the fluid pressure cylinder 18 to return the slider support 17, to the upper position.

During the downward movement of the slider support 17 the slider is displaced a short distance forwardly (to the right when viewed as in FIG. 1) because the slider finger 12C engages a stationary camming member C on the lifting device. Such a camming member C is provided on all lifting devices 13A–13H but is shown in FIG. 1 only at the lifting device 13D. If, for one reason or other, the slider should have been moved rearwardly when the upward movement takes place, the camming member C causes the slider to move forwardly again a sufficient distance to ensure that the slider finger 12C does not engage the sensor K in the final phase of the upward movement; such engagement would immediately trigger a new downward movement of the slider.

Figure 2:
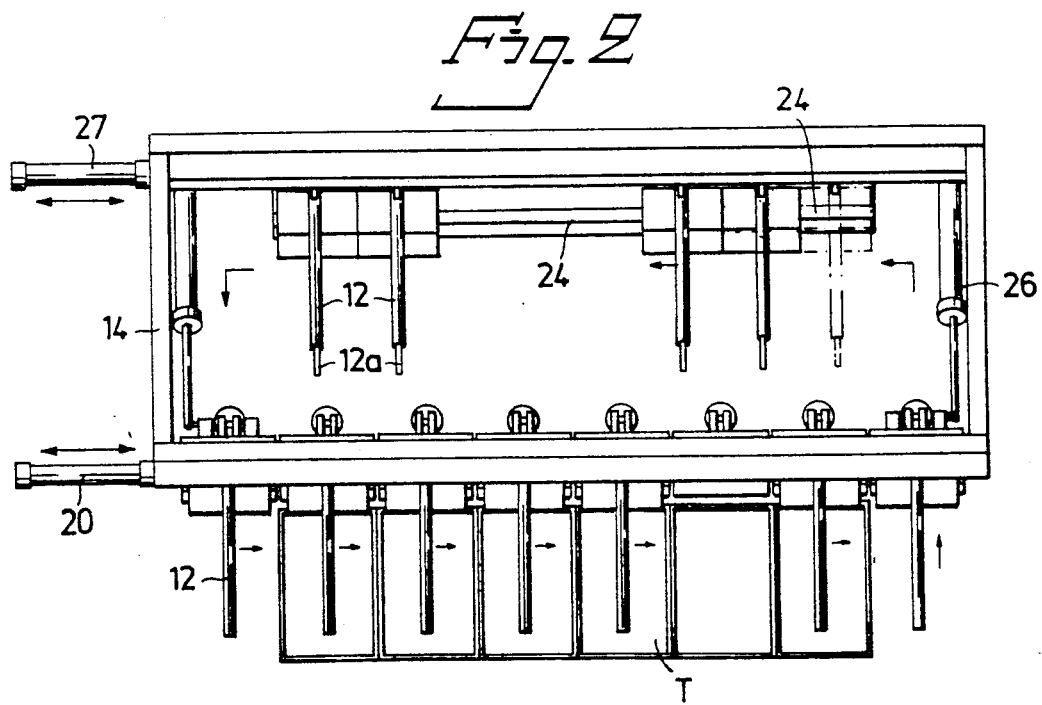
FIG. 2 is a plan view of the installation.

Plates S to be treated with the help of the illustrator conveying apparatus are picked up from the storage rack Mi at the left end of the apparatus (viewed as in FIGS. 1 and 2). The picking up is effected by means of the plate holder 12 of that slider 11 which is positioned on the slider support 17 of the sliding head 16 of the first lifting device 13A. The movement of this slider, hereinafter sometimes referred to as "the observed slider", through the conveying apparatus is described below.

To pick up a plate, the slider support together with its slider, the observed slider, is moved down to the lower position. The two clamps 12A, 12B of the plate holder 12 are caused to engage a plate S brought into a ready position in the storage rack, whereupon the sliding head 16 with the slider support 17, which carries the slider 11 with the plate holder 12 and the plate S, is moved to the upper position. The means by which the plates S in the storage rack Mi are successively brought to the ready position for picking up form no part of the present invention and for that reason are not described.

The driving bar 21 then feeds the slider 11 over to the slider support of the second lifting device 13B. When the sensor K associated with that lifting device has indicated that the slider 11 is in the proper position on the slider support, the latter is moved together with the slider to the lower position (at the same time the above-mentioned short advancement of the slider by the camming member C takes place), so that the plate S is dipped into the bath held in the first tank of the row T of tanks. When the plate S has been kept in the bath for a set time, the control system, through its timing relay T1, triggers a displacement of the slider support together with the slider and the plate held by the slider back to the upper position.

Prior to, or possibly simultaneously with, the pushing over of the observed slider 11 to the slider support 17 of the second lifting device 13B, a different slider located on this slider support is pushed over to the slider support of the third lifting device 13C.

A predetermined period of time after the pushing over of the observed slider 11 to the slider support of the second lifting device 13B, a new slider 11 is positioned on the slider support 17 of the first lifting device 13A in a manner described below. This period of time is at least as long as, and preferably is slightly longer than, the time required for the longest-lasting step of the treatment of the plate S (in the illustrated exemplary embodiment the longest time that the slider is positioned on any of the slider supports 17).

After the observed slider 11 has been returned to the upper position, the driving bar 21 advances this slider 11 and the plate S it carries to the slider support 17 of the third lifting device 13C (at the same time, one or more of the sliders on the other slider supports may, but do not necessarily have to, be advanced from one slider support to the next). The arrival of the observed slider to this slider support is detected by the associated sensor K which triggers a lowering of the slider support and the slider to the lower position so that the plate S is dipped into the bath of the second tank of the row T of tanks. After a predetermined dwell time of the plate S in the bath the slider support is returned together with the slider to the upper position, whereupon the slider is fed over to the next slider support in the manner described above.

A monitoring system, not shown, ensures that a slider is not advanced from one slider support to the next until the latter has returned to its upper position so that the track sections formed by the slider supports are aligned. This monitoring system comprises, for each lifting device 13A–13H, a normally open switch mounted on the driving bar 21, a magnet mounted on the slider and adapted to close the switch when the switch is directly above the magnet and the slider support is in its upper position, and a normally closed switch mounted on the frame 14 of the conveying apparatus and adapted to be opened when the slider support of the next (as viewed in the conveying direction) lifting device arrives at its upper position. In order that the fluid pressure cylinder 20 of the driving bar may perform its forward stroke, one of the two switches has to be open, and this is the case only if both slider supports are in the upper position.

While the observed slider is being advanced from the slider support 17 of the first lifting device 13A to the slider support 17 of the last lifting device 13H along the track formed by the upper edges 17A of the slider supports, the plate S is dipped into the treating baths according to a preset treating program. If desired, one or more baths may be skipped. Such a skip is brought about by making the sensor of the associated lifting device inoperative. In its simplest form, the program is determined by preselected plate dwell times in the baths.

When the slider is advanced to the slider support of the last lifting device 13H, it is displaced, in the same manner as at the preceding lifting devices, to the lower position in which it is caused to deliver the now treated plate S to the discharge storage rack Mu. After the plate has been delivered, the slider support with the slider is returned to the upper position.

In connection with the displacement of the slider support and the slider to the upper position, the slider is transferred to a return track 24 which runs parallel to, and is positioned some distance behind, the row of lifting devices 13A–13H and which is situated at approximately the same level as the advancing or processing track the slider supports define when they are in their upper position. This transfer is effected by the last lifting device 13H. To this end, the last lifting device is pivotable about a horizontal axis 25 which runs parallel to the longitudinal direction of the frame 14 and is located at the lower end of the lifting device. A fluid pressure cylinder 26 (FIGS. 2, 3, 4) pivots the lifting device between a front position in which the slider support 17 in its upper position is aligned with the other slider supports in their upper positions, and a rear position in which the slider support is aligned with the return track 24 (see FIGS. 4 and 6) which is stationary.

When the observed slider 11 has been moved to its upper position and the lifting device 13H has been pivoted to its rear position, the slider can thus be fed over to the return track 24 and then moved further thereon towards the end of the conveying device where the slider picked up the now delivered plate S. The feeding of the slider from the slider support 17 of the last lifting device to the return track 24 is effected by a fluid pressure cylinder 31 which extends parallel to the return track and is made operative by a sensor L mounted on the rear end of the frame 14. This sensor is operated to complete an energising circuit of a solenoid valve (not shown), which causes the piston rod 32 of the cylinder 31 to be extended to push the slider over to the return track 31. Any sliders which have previously been pushed over to the return track are then displaced in the return direction (to the left in FIGS. 1 and 2) by the slider that is being pushed over.

Adjacent the return track 24 there is also a return feeding device 27, 29 similar to the advancing device 20,21,22. The return feeding device is adapted to displace those sliders on the return track which are positioned ahead of, as viewed in the return direction, i.e. to the left of, the position on the return track to which the fluid pressure cylinder 31 feeds the sliders from the lifting device 13H.

Figure 6:
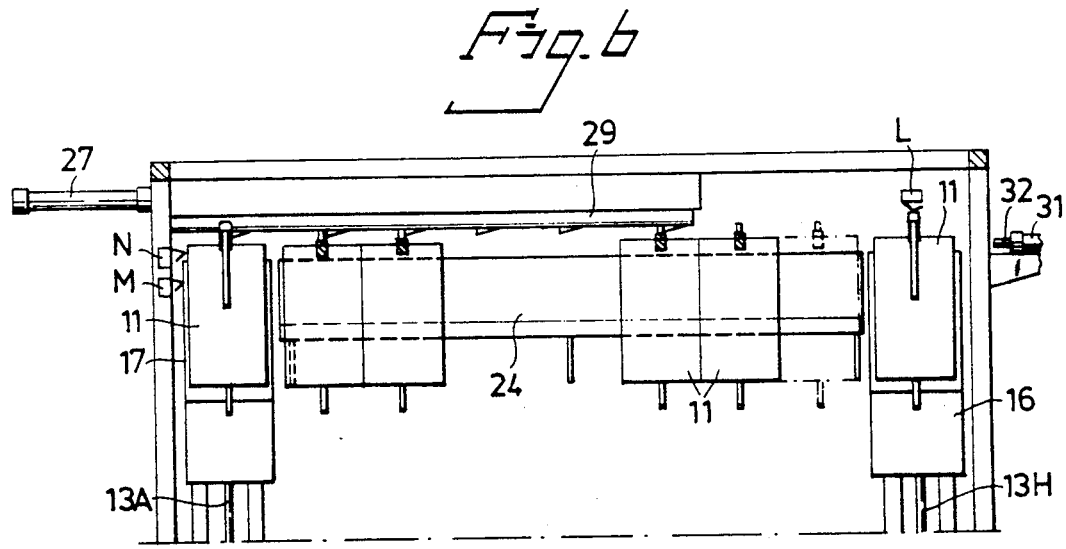
FIG. 6 shows a return track for sliders as viewed from line VI—VI of FIG. 4.

At the end of the stationary return track 24, the observed slider 11 is transferred to the slider support 17 of the first lifting device 13A. To this end, the first lifting device is arranged in the same manner as the lifting device 13H and thus is pivotable about a bottom-level axis 30 between a front position in alignment with the lifting devices 13B–13G and a rear position in which the slider support 17 in the upper position thereof is aligned with the return track. This rear position is shown in FIG. 6. A fluid pressure cylinder similar to the cylinder 26 effects the pivotal movement.

The feeding of the slider 11 to the slider support 17 of the first lifting device 13A is effected by the return feeding device 27, 29 after a sensor M (FIG. 6) has signalled the positioning of this slider support in the upper position. When the slider being fed has reached the proper position on the slider support, the slider actuates a further sensor N which renders the return feed device 27,29 inoperative. After the slider has been transferred, the lifting device 13A is pivoted to its front position and at the same time the slider support starts moving downwardly so that it is at least slightly below the upper position when the lifting device reaches its vertical front position, because if the slider support were to remain in its upper position, it might happen that the advancing device 20,21,22 advances the slider to the second lifting device 13B as soon as the first lifting device 13A reaches its front position. The slider may then be moved through a further cycle of movements in the above-described manner.

In the above-described exemplary treatment process the sliders 11 are advanced only when the slider supports 17 are in their upper position. In other words, the entire track, the processing track, on which the sliders 11 are displaced as the treatment proceeds, is situated at the level corresponding to the upper position of the slider supports.

However, it is quite feasible to have a smaller or greater portion of the processing track positioned at the level corresponding to the lower position of the slider supports 17. In such case, one or more of the tanks indicated in FIG. 2 have to have an extension in the direction of displacement which is sufficient to permit displacement of the sliders 11 along such a portion of the track.

In the illustrated embodiment of the conveying device, the displacement of the sliders 11 along such a low-level track portion may be effected by means of a feeding device 35 (FIGS. 3, 4). This feeding device is similar to the feeding device 20,21,22 and coacts with a finger 12D which is similar to the finger 12C but is attached to the lower portion of each slider 11. Sensors corresponding to the sensors K are also provided for the lower track portion, although they are not shown in the drawings.

As is apparent from the foregoing description, the dwell time may be chosen arbitrarily for each station, i.e. for each bath, as long as it does not exceed the time that elapses between two successive transfers of sliders from the first lifting device 13A to the second lifting device 13B. This means, for example, that if in any particular treating process dipping into one or more of the baths is not required or permissible, the lifting devices associated with such baths may be rendered inoperative in the above-described manner so that the sliders move past them without performing a vertical movement.

If any single bath requires much longer immersion time than the other baths, it may be advantageous to divide the immersion time for this bath into a plurality of shorter immersion times with intervening advancements of the slider. The pace at which sliders are transferred from the first lifting device to the second can thereby be increased.

A further important advantage of the conveying device according to the invention is that if for one reason or other a plate S has to be withdrawn from the treating process in the course of the treatment, this can be done by unhooking the slider 11 carrying this plate from the slider support on which it is positioned at the moment. The treatment of the other plates is not affected thereby in any way. This advantage is achieved by the feature which consists in the sliders themselves triggering their vertical displacement by means of the sensors K. In FIG. 1, one slider has been removed in this way so that the lifting device 13F has no slider in the illustrated phase of a treating cycle.

In the embodiment shown in the drawings, all slider supports 17 are of equal length, as measured in the direction of movement. That is, all of the track sections defined by the upper edges 17A of the slider supports are of equal lengths. It is within the scope of the invention, however, to make them different in respect of their length. It may be advantageous to do so for example in the above-mentioned case where the immersion time for a given bath is distributed over several immersions in that bath. In such a case, the slider support for this bath may be long enough to support a number of sliders equal to the number of immersions in the bath.

It is also within the scope of the invention to interpose a stationary track section between successive lifting devices.

I claim:

1. Apparatus for conveying article carriers along a succession of processing stations, particularly in an installation for dip treatment of articles supported by the article carriers, comprising:
   means for stepwise displacement of the article carriers in succession on a processing track which supports the article carriers and along which the processing stations are positioned;
   means for vertically displacing the article carriers individually between an upper and a lower position, said means including, for each processing station, an article carrier support which defines a separate section of the track and is movable between the upper position and the lower position together with an article carrier; and
   control devices associated with respective ones of the article carrier supports and positioned along the processing track, the control devices being connected to said means for vertically displacing the article carriers and adapted to trigger the vertical displacement of the respective associated processing track section in response to an article carrier occupying a predetermined position on the processing track.

2. Apparatus as claimed in claim 1, characterized in that at least two article carrier supports associated with adjacent processing stations can follow one directly after the other when all of these article carrier supports are at the upper position and also when they are all at the lower position.

3. Apparatus according to claim 2 characterized in that a return track for the article carriers is positioned substantially parallel to and at about the same level as the processing track, in that an article carrier support defining an end section of the processing track is moveable between a first position in which it defines said end section and a second position in which it defines a portion of the return track.

4. Apparatus according to claim 3, characterized in that an article carrier support defining a second end section of the processing track is displaceable between a first position in which it defines said second end section and a second position in which it defines a portion of the return track.

5. Apparatus according to claim 4, characterized in that the article carrier support forms part of a lifting device which is pivotable about a horizontal axis to displace the article carrier support from the first position to the second position.

6. Apparatus according to claim 5, characterized in that there are provided for each article carrier support an elongate guide for the article carrier support and a linear motor, preferably a fluid pressure cylinder, which extends along the guide and is connected between the article carrier support and a substantially stationary portion of the guide.

7. Apparatus according to claim 6 characterized in that the article carriers are removable from the processing track regardless of their position on it.

8. Apparatus according to claim 1 characterized in that a return track for the article carriers is positioned substantially parallel to and at about the same level as the processing track, in that an article carrier support defining an end section of the processing track is movable between a first position in which it defines said end section and a second position in which it defines a portion of the return track.

9. Apparatus according to claim 8, characterized in that an article carrier support defining a second end section of the processing track is displaceable between a first position in which it defines said second end section and a second position in which it defines a portion of the return track.

10. Apparatus according to claim 9, characterized in that the article carrier support forms part of a lifting device which is pivotable about a horizontal axis to displace the article carrier support from the first position to the second position.

11. Apparatus according to claim 8, characterized in that the article carrier support forms part of a lifting device which is pivotable about a horizontal axis to displace the article carrier support from the first position to the second position.

12. Apparatus according to claim 1, characterized in that there are provided for each article carrier support an elongate guide for the article carrier support and a linear motor, preferably a fluid pressure cylinder, which extends along the guide and is connected between the article carrier support and a substantially stationary portion of the guide.

13. Apparatus according to claim 1 characterized in that the article carriers are removable from the processing track regardless of their position on it.

* * * * *